Nov. 29, 1966 N. B. KELL 3,287,909
HYDROSTATIC TRANSMISSION
Filed March 11, 1964 2 Sheets-Sheet 2

INVENTOR.
Nathaniel B. Kell
BY
A. M. Neiter
ATTORNEY

United States Patent Office 3,287,909
Patented Nov. 29, 1966

3,287,909
HYDROSTATIC TRANSMISSION
Nathaniel B. Kell, Indianapolis, Ind., assignor to General Motors Corporation, Detroit, Mich., a corporation of Delaware
Filed Mar. 11, 1964, Ser. No. 351,047
17 Claims. (Cl. 60—54.5)

This invention relates to transmissions and more particularly to hydrostatic transmissions.

Conventional hydrostatic transmissions which make use of the movement of fluid under pressure from a hydraulic pump to drive a hydraulic motor generally employ a continuous flow circuit wherein fluid is caused to continuously circulate between the pump and motor. Eddies, swirls and cavitation of various degrees which decrease fluid flow efficiency are inherent in these continuous flow circuits and it is desirable that the magnitudes of these fluid flow phenomena be lessened to increase transmission efficiency.

Because of the various types of pumps and motors available, the different environments in which they may work and the operating characteristics of a particular pump and motor in relation to the fluid used, it has been found to be desirable to effectively separate the fluid circuitry of the pump and motor so that the pump can pump fluid differing in viscosity and/or chemical compositions from that of the fluid driving the motor. If the fluid circuitry for the pump and motor can be separated, it is then possible to match a particular fluid to the pump and motor used to enhance pump and motor performance. Where a transmission is contemplated as being used in an application where harmful radioactivity is present, the conventional hydrostatic transmission must be wholly isolated within the shielded contamination area because the conventional continuous flow circuit inseparably connects hydraulically the pump and motor. If the fluid circuitry for the pump and motor were separated, contamination could be effectively restricted to either the pump or the motor.

Another disadvantage of conventional hydrostatic transmissions is that generally the motor cannot overrun the driving pump during transmission operation since the pump and motor are normally hydraulically connected during operation. In addition to it being desirous to permit the motor to overrun the pump in applications such as where motor coasting is a desirable feature, it has also been found desirable to automatically prevent the motor from reversing when conditioned for forward operation in applications such as where conveyors are used to elevate loads. Furthermore it has been found desirable to obtain forward and reverse motor operation and motor uncoupling by selective control without effecting pump operation.

The transmission of this invention which will be referred to as a hydrostatic pulse transmission, employs a hydraulic pulse generator and a hydraulic pulse responsive motor and utilizes the pulsating movement of fluid under pressure from the generator to drive the motor. The hydraulic pulse generator when operating alternately imparts a pulsating movement to fluid in a first conduit connected to a first fluid delivery chamber and to fluid in a second conduit connected to a second fluid delivery chamber. When fluid in the first conduit is pulsed by the hydraulic pulse generator, this pulsating movement of fluid is transmitted through the first conduit to the first fluid delivery chamber where the fluid pressure being transmitted unseats a one-way valve and is then permitted to impart a hydraulic force to drive the hydraulic pulse responsive motor in one direction corresponding to either forward or reverse motor operation. The fluid after having performed its driving function has a pressure sufficient to unseat another one-way valve which then permits the transmission of the pulsed fluid movement to the second fluid delivery chamber whereby the pulsated movement of fluid is transmitted through the second fluid delivery chamber to the connected second conduit to complete half cycle operation and condition the fluid circuitry for the remaining half cycle. On the remaining half cycle, the fluid in the second conduit is pulsed by the hydraulic pulse generator and this pulsated movement of fluid is transmitted through the second conduit to the second fluid delivery chamber where the fluid pressure being transmitted unseats a one-way valve and is then permitted to impart a hydraulic force to drive the hydraulic pulse responsive motor in the one direction. The fluid after having performed its driving function has a pressure sufficient to unseat another one-way valve which then permits the transmission of the pulsed fluid movement to the first fluid delivery chamber whereby the pulsated movement of fluid is transmitted through the first fluid delivery chamber to the connected first conduit to complete the full cycle and condition the fluid circuitry for subsequent cycles.

Since the fluid movement is a pulsating fluid movement, rather than a continuous flow as in conventional hydrostatic transmissions, the magnitudes of eddies, swirls and cavitation are lessened and the fluid circuitry of the generator and motor can be effectively separated. To separate the fluid circuitry of the hydraulic pulse generator from that of the hydraulic pulse responsive motor, there is provided a coupling motor in both the first and second conduits which prevent the communication of fluid between the hydraulic pulse generator and the hydraulic pulse responsive motor. The coupling motors each operate in consonance with the fluid pulsations in the conduits to impart inphase fluid pulsations between the now separated fluid on the hydraulic pulse generator side of the coupling motors and the hydraulic pulse responsive motor side of the coupling motors.

To permit the hydraulic pulse responsive motor to drive in either a forward or reverse direction and without affecting the operation of the hydraulic pulse generator there is provided a selector valve which when in one condition conditions the fluid circuitry of the hydraulic pulse responsive motor so that, for example, all the pulsed fluid pressure is directed to impart a hydraulic force to drive the hydraulic pulse responsive motor in one direction, as described above, and when in another condition directs all the pulsed fluid pressure to impart a hydraulic force to drive the hydraulic pulse responsive motor in the opposite direction.

The hydraulic pulse responsive motor is permitted to overrun the hydraulic pulse generator by the one-way valves which all open in response to the faster than normal cycling of the hydraulic pulse responsive motor relative to the hydraulic pulse generator during overrunning operation to provide an open fluid circuit condition within the hydraulic pulse responsive motor fluid circuitry to permit motor overrun. The hydraulic pulse responsive motor is prevented from reversing its conditioned drive direction by the one-way valves which permit flow in only one normal direction to effect the conditioned drive direction and close to prevent reverse flow to hydraulically lock up the hydraulic pulse responsive motor so that the hydraulic pulse responsive motor cannot reverse its direction such as when power to the hydraulic pulse generator is interrupted and the motor load tends to drive the hydraulic pulse responsive motor in reverse.

To uncouple the hydraulic pulse responsive motor from the hydraulic pulse generator, there is provided an uncoupling valve which when opened directly connects the first and second conduits so that fluid pulsations are not transmitted to the hydraulic pulse responsive motor while the hydraulic pulse generator continues to operate.

It is an object of this invention to provide an improved hydrostatic transmission.

It is another object of this invention to provide a hydrostatic transmission system employing a hydraulic pulse generator delivering alternating fluid pulses to drive a hydraulic pulse responsive motor.

It is another object of this invention to provide a hydraulic pulse generator delivering alternating fluid pulses to drive a hydraulic pulse responsive motor, the hydraulic pulse responsive motor being capable of overrunning the hydraulic pulse generator, being capable of forward and reverse drive operation without reconditioning of the hydraulic pulse generator operation, and being capable of being hydraulically locked up to prevent one motor drive operation when the hydraulic pulse responsive motor is conditioned for another motor drive operation.

It is another object of this invention to provide a hydrostatic transmission having a hydraulic pulse generator having a separate fluid circuit and a hydraulic pulse responsive motor having a separate fluid circuit with the fluid circuits being operatively connected whereby the hydraulic pulse generator when operating and providing alternating, pulsating movement in the fluid circuitry drives by these alternating, pulsating movements the hydraulic pulse responsive motor.

It is another object of this invention provide a hydrostatic transmission employing a hydraulic pulse generator, a hydraulic pulse responsive motor and separate fluid circuits operatively connecting the generator to the motor delivering alternating, pulsating fluid movements imparted by the generator to drive the motor, an uncoupling valve to condition the fluid circuitry for the interruption of the delivery of the pulsating fluid movements to drive the motor, and a selected valve for directing the pulsating fluid movements to drive the motor in one direction and for directing the pulsating fluid movements to drive the motor in the opposite direction.

It is another object of this invention to provide a hydrostatic transmission employing a hydraulic pulse generator imparting alternating, pulsating movements to the fluid in two separate conduits to alternately pulsate two reciprocating coupling motors connected to the two separate conduits, the coupling motors reciprocating in alternate directions and in consonance with the hydraulic pulsations in the conduits to impart alternating, pulsating movements to the fluid in two other separate conduits which are connected to two separate fluid delivery chambers of a hydraulic pulse responsive motor, one-way valves delivering fluid in the fluid delivery chambers when pulsed to drive the hydraulic pulse responsive motor, and one-way valves delivering the fluid pulsations after they have performed their driving function to the fluid delivery chamber and connected conduit opposite from which it has been delivered so that the alternating pulsating movements of the fluid in the fluid delivery chambers are effective to drive the hydraulic pulse responsive motor in one direction, the one-way valves opening to provide an open fluid circuit in the hydraulic pulse responsive motor to permit overspeed of the hydraulic pulse responsive motor relative to the hydraulic pulse generator and closing to hydraulically lock up the hydraulic pulse responsive motor to prevent the hydraulic pulse responsive motor from being driven in the opposite direction.

These and other objects of the invention will be more apparent from the following description of the preferred embodiments of the invention illustrated in the accompanying drawing in which.

Figure 1:
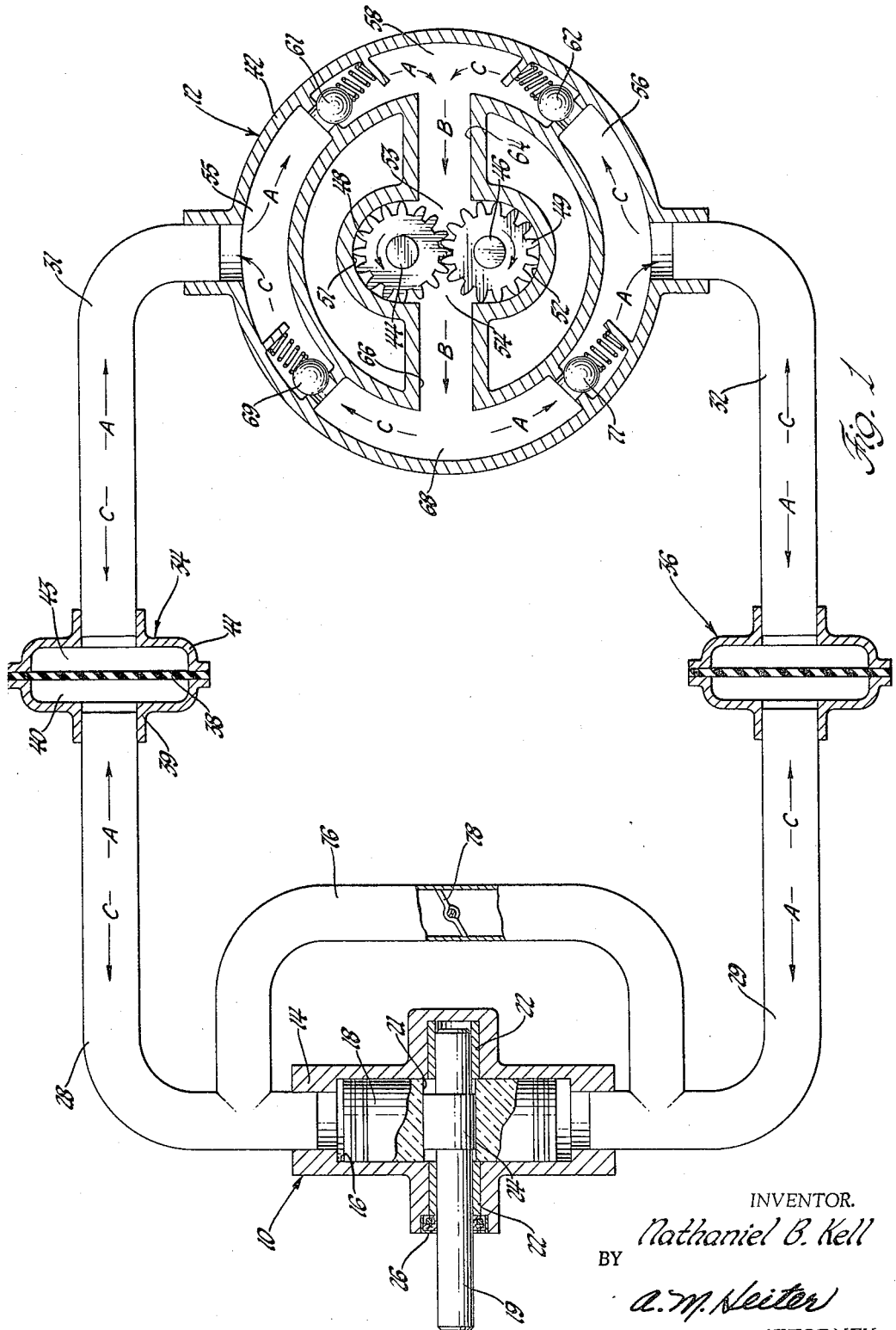
FIGURE 1 is a diagrammatic view of a hydrostatic pulse tranmission according to this invention.

The hydrostatic pulse transmission of this invention is adapted to transmit power from a rotating input to drive a rotary output and employs a hydraulic pulse generator generally designated at 10 and a hydrualic pulse responsive motor generally designated at 12.

The hydraulic pulse generator 10 is a positive displacement type pump and comprises a pump housing 14 having a cylinder 16 in which is slidably mounted a double-ended piston 18 provided with suitable piston rings. A drive shaft 19 extends through a central slot 21 in piston 18 and is supported for rotation by axially aligned bushings 22 mounted in axially spaced bores in the housing 14. An eccentric or cam 24 integral with shaft 19 engages the walls of slot 21 so that upon rotation of shaft 19 the eccentric 24 imparts reciprocal movement to the piston 18. A seal 26 mounted in a counterbore in housing 14 seals the left-hand end of shaft 19 to prevent leakage, the right-hand end of shaft 19 being received in the closed end bore, and the shaft 19 is rotated by a suitable prime mover, not shown.

Reciprocation of piston 18 imparts a pulsating movement to fluid contained in generator conduits 28 and 29 which are connected to the opposite ends of cylinder 16. Pulsating movement of the fluid in conduits 28 and 29 is in turn transmitted to fluid contained in motor conduits 31 and 32 respectively by coupling motors 34 and 36 respectively which are effective to separate the fluid contained in conduits 28 and 29 from the fluid contained in conduits 31 and 32. Coupling motors 34 and 36 have corresponding parts and comprise, for example, by referring to coupling motor 34, a flexible or elastic diaphragm 38 clamped between a body flange 39 having a chamber 40 which is connected to the conduit 28 and a body flange 41 having a chamber 43 which is connected to the conduit 31 with the chambers 40 and 43 being separated by the diaphragm 38. When the generator 10 is in operation and the piston 18 reciprocates, the diaphragm of the motors 34 and 36 flex in alternate directions and in consonance with the fluid pulsations in conduits 28 and 29 respectively to impart to the fluid contained in conduits 31 and 32 pulsating fluid movements which are in consonance with the pulsating fluid movements in conduits 28 and 29 respectively.

The hydraulic pulse responsive motor 12 comprises a stationary motor housing 42 which rotatably supports a pair of parallel shafts 44 and 46. Rigidly connected to shafts 44 and 46 are meshing motor gears 48 and 49 which are located in fluid transfer chambers 51 and 52 respectively of housing 42. A motor chamber 53 exposing portions of the teeth of the meshing motor gears 48 and 49 on one of their sides interconnects the fluid transfer chambers 51 and 52 and a motor chamber 54 exposes portions of the teeth of the meshing motor gears 48 and 49 on another of their sides and like motor chamber 53 also interconnects the fluid transfer chambers 51 and 52. Fluid pressure when supplied to either motor chamber 53 or 54 imparts rotary movement to the gears 48 and 49 whose directions of rotation are dependent upon which motor chamber is supplied with fluid pressure. Rotary output from the hydraulic pulse responsive motor 12 is derived from either shaft 44 or 46 or both.

Fluid pressure to drive the motor gears 48 and 49 is delivered by fluid filled delivery chambers 55 and 56 in housing 42 which are connected to conduits 31 and 32 respectively. Fluid in delivery chambers 55 and 56 is permitted to enter into a fluid filled supply chamber 58 by check vales 61 and 62 respectively when fluid pulsations are alternately transmitted to the delivery chambers 55 and 56 from conduits 31 and 32 respectively. The check valves 61 and 62 prevent reverse flow from supply chamber 58 to delivery chambers 55 and 56 respectively. A fluid filled passage 64 connects chamber 58 to motor chamber 53 and a fluid filled passage 66 connects the other motor chamber 54 to to a fluid filled return chamber 68 from which fluid can flow through either a check valve 69 to be returned to delivery chamber 55 or through a check valve 71 to be returned to delivery chamber 56 as will be described in more detail later. The check valves 69 and 71 prevent reverse flow of fluid from delivery chamber 55 to return chamber 68 and from delivery chamber 56 to return chamber 68 respectively.

To stop operation of the hydraulic pulse responsive motor 12 while the hydraulic pulse generator 10 continues to operate, there is provided a conduit 76 for connecting conduit 28 to conduit 29. In conduit 76, there is provided an uncoupling valve 78 which when closed prevents communication of the fluid in conduits 28 and 29 for normal drive operation and when open allows direct fluid communication between conduits 28 and 29 so that fluid pulsations will not be transmitted to drive the motor 12.

Describing now the operation, the driving shaft 19 when being driven by a prime mover imparts reciprocal movement to the piston 18 by the action of the eccentric 24. The uncoupling valve 78 is closed to prevent fluid communication between the conduits 28 and 29 and on the upward stroke of the piston 18, fluid in conduit 28 is pulsed. The direction of fluid movement in the fluid circuitry on the upward stroke is indicated by the arrows A except for fluid movement in the passages 64 and 66 which is indicated by the arrows B as will be subsequently explained in detail. Movement of fluid in conduit 28 as indicated by the arrow A flexes the diaphragm 38 of coupling motor 34 to transmit to the fluid in conduit 31 a pulsed fluid movement in consonance with the fluid movement in conduit 28. Fluid in conduit 31 is thus forced to enter the delivery chamber 55 and the resulting pressure of the fluid in delivery chamber 55 unseats the check valve 61 so that there is pulsed fluid flow into the supply chamber 58. Fluid in supply chamber 58 is then forced to enter passage 64 resulting in fluid flow in passage 64 in the direction indicated by the arrow B. The fluid forced through passage 64 into the motor chamber 53 imparts rotary motion to motor gears 48 and 49 whose directions of rotation are indicated by the directional arrows on the respective gears with the fluid separating into two paths to be carried between the teeth of the motor gears for passage through the transfer chambers 51 and 52 respectively. The fluid upon leaving the transfer chambers 51 and 52 unite in the motor chamber 54 and then flows in the direction indicated by the arrow B in passage 66 where it is directed to return chamber 68. The pressure of the fluid in delivery chamber 55 prevents unseating of the check valve 69 and the pressure of the fluid in return chamber 68 is sufficient to unseat the check valve 71 and permit fluid flow from return chamber 68 as indicated by the arrow A into the delivery chamber 56. The pressure of the fluid in supply chamber 58 prevents unseating of the check valve 62 and the fluid in delivery chamber 56 flows in the direction indicated by the arrow A into the conduit 32. Fluid movement in conduit 32 as indicated by the arrow A flexes the diaphragm of the coupling motor 35 to move the fluid in conduit 29 in the direction indicated by the arrow A and permit expansion of the fluid circuitry downstream of motor chamber 54 to receive the expended fluid. Movement of the fluid in conduit 29 charges the lower end of cylinder 16 and completes half cycle operation, it being remembered that coupling valve 78 is closed and that the piston 18 is on its upward stroke.

On the downward stroke of piston 18 fluid flow is reversed in the fluid circuitry as indicated by the directional flow arrows C except in passages 64 and 66 where it continues to flow in the directions indicated by the arrows B like on the upward piston stroke. Check valves 62 and 69 are unseated on this remaining half cycle while the check valves 61 and 71 seat and remain seated.

The hydraulic pulse responsive motor 12 is permitted to overrun the hydraulic pulse generator 10 since under such conditions the hydraulic pulse responsive motor 12 will be cycling at a faster rate than the hydraulic pulse generator 10. Under these conditions the pressure of the fluid discharged from the overrunning motor gears 48 and 49 will unseat both check valves 69 and 71 and subsequently unseat check valves 61 and 62 to again permit fluid to reenter the passage 64 thus providing an open fluid circuit condition within the hydraulic pulse responsive motor 12 to permit overrunning of the hydraulic pulse responsive motor 12 with respect to the hydraulic pulse generator 10.

Since the check valves 61, 62, 69 and 71 permit flow in only one direction to effect the conditioned drive direction, reversal of flow direction is effectively prevented by these check valves which seat in response to such reverse flow to hydraulically lock up the motor gears 48 and 49 so that the hydraulic pulse responsive motor 12 cannot reverse its direction such as when power to the hydraulic pulse generator 10 is interrupted and the connected motor load tends to drive the hydraulic pulse responsive motor 12 in a direction opposite its conditioned drive direction.

The hydraulic pulse responsive motor 12 is effectively disconnected or uncoupled from the hydraulic pulse generator 10 while the hydraulic pulse generator 10 continues to operate by moving the uncoupling valve 78 to an open position to communicate the fluid in conduits 28 and 29 with the result that fluid pulsations are transmitted back and forth between the opposite ends of pump cylinder 16 and are not transmitted to the coupling motors 36 and 36 and thus to the hydraulic pulse responsive motor 12. Opening of the uncoupling valve 78 thus conditions the transmission for neutral and permits the hydraulic pulse generator 10 to continue to operate without driving the hydraulic pulse responsive motor 12.

It will be observed that the hydrostatic pulse transmission illustrated in FIGURE 1 rotates the motor output shafts 44 and 46 in the directions indicated by the arrows which will for convenience be referred to as the shafts' forward directions. If it is desired to rotate shafts 44 and 46 selectively in both their forward directions and in reverse directions, a motor assembly shown as a modification in FIGURE 2 may be employed.

Figure 2:
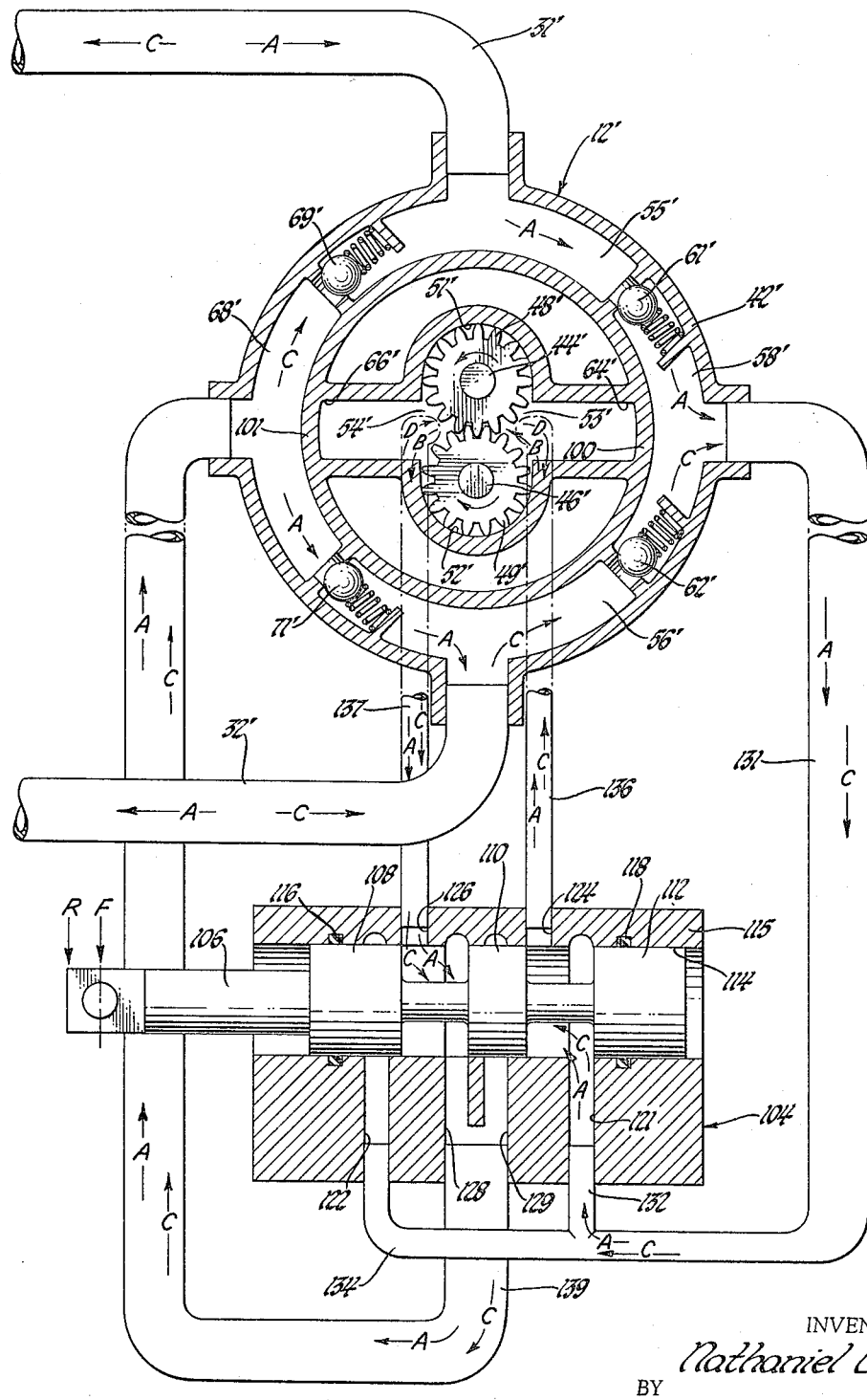
FIGURE 2 is a modification of the hydrostatic pulse transmission shown in FIGURE 1.

In the modification shown in FIGURE 2, motor parts similar to those shown in FIGURE 1 are designated by the same numerals only primed. Motor conduit 31' like conduit 31 is connected to delivery chamber 55' of the hydraulic pulse responsive motor 12' and motor conduit 32' like conduit 32 is connected to delivery chamber 56'. Check valve 61' is operable to connect delivery chamber 55' to supply chamber 58' and check valve 62' is operable to connect delivery chamber 56' to the chamber 58'. Check valve 69' is operable to connect return chamber 68' to delivery chamber 55' and check valve 71' is operable to connect return chamber 68' to delivery chamber 56'.

In this modification, direct fluid communication between the supply chamber 58' and passage 64' is blocked by the wall section 100 and direct fluid communication between the passage 66' and return chamber 68', is blocked by the wall section 101. The motor gears 48' and 49', rigidly connected to the shafts 44' and 46' respectively, mesh and are located in fluid transfer chambers 51' and 52' respectively provided in the housing 42'. Rotary output from the motor 12' is derived from either shaft 44' or shaft 46' or both with the motor gears 48', and 49' rotating in either the forward or reverse direction by selective communication of the pulsed fluid pressure to the passage 64' and connected motor chamber 53' for forward rotation like in the hydraulic pulse responsive motor 12 and by communication of the pulsed fluid pressure to the passage 66' and connected motor chamber 54' for reverse rotation.

To provide for selective communication of fluid pressure to either passage 64' for forward rotation or passage 66' for reverse rotation, there is provided a manual selector valve generally designated at 104 which has a spool valve element 106 having lands 108, 110 and 112 located in a bore 114 of a valve body 115 for reciprocal movement between a forward position (F) and a reverse position (R). Seals 116 and 118 prevent leakage past the lands 108 and 112 respectively.

In the valve body 115 there is provided a forward supply port 121, a reverse support port 122, a forward delivery port 124, a reverse delivery port 126, a forward return port 128, and a reverse return port 129. A conduit 131 connects supply chamber 58', to the forward supply port 121 and the reverse supply port 122 via branch lines 132 and 134 respectively. A conduit 136 connects the forward delivery port 124 to the passage 64' and a conduit 137 connects the reverse delivery port 126 to the passage 66'. A conduit 139 connects both return ports 128 and 129 to the return chamber 68'.

Describing now the operation of the modification shown in FIGURE 2, when the spool valve element 106 is in the forward position (F) shown in FIGURE 2, the forward supply port 121 and the forward delivery port 124 are connected between the lands 110 and 112, the reverse delivery port 126 and the forward return port 128 are connected between the lands 108 and 110 and the land 108 is in a position to block the reverse supply port 122. All of the fluid circuitry is filled with fluid and when the fluid in conduit 31' is pulsed by the hydraulic pulse generator on the first half of the cycle, fluid movement in the fluid circuitry is in the direction indicated by the arrows A except for fluid flow through passages 64' and 66' which is indicated by the arrows B. The resulting pulsed fluid pressure in delivery chamber 55' unseats check valve 61' so that fluid flow is then from delivery chamber 55' to supply chamber 58' resulting in fluid flow into conduit 131 and the transmittal of the pulsed fluid movement to the selector valve 104 by the branch line 132 which is connected to forward supply port 121. Fluid is thus forced to pass between lands 110 and 112 to the forward delivery port 124 where pulsed fluid movement is then transmitted by the conduit 136 to the passage 64'. The flow of the fluid forced into passage 64' and connected motor chamber 53' as indicated by the directional arrow B imparts rotary motion to motor gears 48' and 49' whose forward directions of rotation are indicated by the arrows on the respective gears with the fluid separating into two paths to be carried between the teeth of the motor gears for passage through the transfer chambers 51' and 52' respectively. The fluid upon leaving the transfer chambers unites in the motor chamber 54' and then flows in the direction indicated by the arrow B in passage 66' where it is then directed to the conduit 137. Fluid movement in conduit 137 is in the direction indicated by the arrow A with the fluid flowing through the reverse delivery port 126 and passing between the lands 108 and 110 to enter the forward return port 128 and connected conduit 139. Fluid in conduit 139 whose movement is in the direction indicated by the arrows A flows into return chamber 68' where the fluid pressure unseats the check valve 71' to permit fluid to enter delivery chamber 56' which is connected to conduit 32' to provide for expansion like in the fluid circuitry of FIGURE 1. Under such conditions, the check valve 69' remains seated by the fluid pressure in the delivery chamber 55' and the check valve 62' remains seated by the fluid pressure in supply chamber 58'.

On the remaining half cycle, the fluid in conduit 32', is pulsed by the hydraulic pulse generator and fluid movement is in the direction indicated by the arrows C except for fluid flow in the passages 64' and 66' where fluid flow is again indicated by the arrows B. The resulting pulsed fluid pressure in chamber 56' unseats check valve 62' so that fluid flow is then from delivery chamber 56' to supply chamber 58' resulting in fluid flow into conduit 131 and the transmittal of the pulsed fluid movement to the selector valve 104 by the branch line 132 which is connected to the forward supply port 121. Fluid is thus forced to pass between the lands 110 and 112 to the forward delivery port 124 where pulsed fluid movement is then transmitted by the conduit 136 to the passage 64'. The flow of the fluid into passage 64' and connected motor chamber 53' as indicated by the directional arrow B imparts rotary motion to the motor gears 48' and 49' like on the first half of the cycle. The fluid after performing its driving function units in motor chamber 54' and then flows through passage 66' in the direction indicated by the arrow B where it is then directed to enter conduit 137. Fluid movement in conduit 137 is in the direction indicated by the arrow C with the fluid flowing through the reverse delivery port 126 and passing between the lands 108 and 110 to enter the forward return port 128 and connected conduit 139. Fluid in conduit 139 whose fluid movement is in the direction indicated by the arrows C flows into return chamber 68' where the fluid pressure unseats the check valve 69' to permit fluid to enter delivery chamber 55' which is connected to conduit 31' to provide for expansion and complete the remaining half cycle of motor operation. Under such conditions, the check valve 71' remains seated by the pressure in delivery chamber 56' and the check valve 61' remains seated by the pressure in supply chamber 58'.

To reverse the directions of rotation of the shafts 44 and 46, the spool valve element 106 is moved to the reverse position (R) where the reverse supply port 122 and the reverse delivery port 126 are connected between the lands 108 and 110, the forward delivery port 124 and the reverse return port 129 are connected between the lands 110 and 112 and the land 112 blocks the forward supply port 121. Under these conditions, when the fluid is pulsed in conduit 31' on the first half cycle of operation, the resulting pulsed fluid pressure in delivery chamber 55' unseats check valve 61' so that fluid flow is then from delivery chamber 55' to supply chamber 58' as indicated by the arrow A resulting in fluid flow into conduit 131 and the transmittal of the pulsed fluid movement to the selector valve 104 by the branch line 134 which is connected to reverse supply port 122. Fluid is thus forced between lands 108 and 110 to the reverse delivery port 126 where pulsed fluid movement is then transmitted in a direction opposite the direction of arrow A by the conduit 137 to the passage 66'. The flow of the fluid forced into passage 66' and connected motor chamber 54' as indicated by the directional flow arrow D imparts rotary motion to motor gears 48' and 49' in directions opposite those indicated by the arrows on the respective gears with the fluid separating into two paths to be carried between the teeth of the motor gears for passage through the transfer chambers 51' and 52' respectively. The fluid upon leaving the transfer chambers unites in the motor chamber 53' and then flows in direction indicated by the arrow D in passage 64' where it is then directed to the conduit 136. Fluid movement in conduit 136 is opposite the direction indicated by the arrow A with the fluid flowing through the forward delivery port 124 and passing between the lands 110 and 112 to enter the reverse return port 129 and connected conduit 139. Fluid in conduit 139 whose fluid movement is in the direction indicated by the arrows A flows into return chamber 68' where the fluid pressure unseats the check valve 71' to permit fluid to enter delivery chamber 56' which is connected to conduit 32' to provide for expansion. Under such conditions, the check valve 69' remains seated by the fluid pressure in the delivery chamber 55' and the check valve 62' remains seated by the fluid pressure in supply chamber 58'.

On the remaining half cycle, the fluid in conduit 32' is pulsed and fluid movement in conduit 32' is in the direction indicated by the arrow C. The resulting pulsed fluid pressure in delivery chamber 56' unseats check valve 62' so that the fluid flow is then from delivery chamber 56' to supply chamber 58' resulting in fluid flow into conduit 131' and the transmittal of the pulsed fluid movement to the selector valve 104 by the branch line 134 which is connected to the reverse supply port 122. Fluid is thus forced to pass between the lands 108 and 110 to the reverse delivery port 126 where pulsed fluid movement is then transmitted by the conduit 137 to the passage 66' flowing in a direction opposite the direction of arrow C. The flow of fluid into passage 66' and connected motor chamber 54' as indicated by the directional flow arrow D imparts rotary motion to the motor gears 48' and 49' like on the first half cycle of reverse operation and the fluid after performing its driving function unites in motor chamber 53' and then flows through passage 64' in the direction indicated by the arrow D where it is then directed to enter conduit 136. Fluid movement in conduit 136 is opposite the direction indicated by the arrow C with the fluid flowing through the forward delivery port 124 and passing between the lands 110 and 112 to enter the reverse return port 129 and connected conduit 139. Fluid in conduit 139 whose fluid movement is in the direction indicated by the arrow C flows into return chamber 68' where the fluid pressure unseats the check valve 69' to permit fluid to enter delivery chamber 55' which is connected to conduit 31' to provide for expansion and to complete the remaining half cycle of reverse motor operation. Under such conditions, the check valve 71' remains seated by the pressure in delivery chamber 56' and the check valve 61' remains seated by the pressure in supply chamber 58'.

The check valves 61', 62', 69' and 71' like the check valves 61, 62, 69 and 71 prevent reverse flow when the hydraulic pulse responsive motor 12' is conditioned for either forward or reverse operation so that the hydraulic pulse responsive motor 12' will be hydraulically locked up and not be permitted to reverse from its condition drive direction such as when power to the hydraulic pulse generator is interrupted and the motor load tends to drive the hydraulic pulse responsive motor 12' in a direction opposite its condition drive direction.

The hydraulic pulse responsive motor 12' like the hydraulic pulse responsive motor 12 is permitted to overrun the hydraulic pulse generator regardless of whether the hydraulic pulse responsive motor 12' is operating in forward or reverse since the direction of fluid flow in the delivery chambers 55' and 56', supply chamber 58' and return chamber 68' remains the same during forward and reverse operation to thus permit the check valves 61', 62', 69' and 71' to open to provide an open fluid circuit condition within the hydraulic pulse responsive motor 12'.

Where contamination is not a problem and where the fluid is suited for both the hydraulic pulse generator and the hydraulic pulse responsive motor, the generator conduits can be directly connected to the motor conduits to provide direct fluid communication between the hydraulic pulse generator and hydraulic pulse responsive motor. It will be further understood that different types of hydraulic pulse generators, hydraulic pulse responsive motors and valves can be used as well as different types of coupling motors. Furthermore, the fluid medium can be either liquid or gas.

The above-described preferred embodiments are illustrative of the invention which may be modified within the scope of the appended claims.

I claim:
1. In a transmission, the combination of
(a) a hydraulic pulse generator, a hydraulic pulse responsive motor, and fluid circuitry containing fluid operatively connecting said hydraulic pulse generator to said hydraulic pulse responsive motor,
(b) said hydraulic pulse generator being operable when driven to impart alternating pulsed movement to the fluid in said fluid circuitry, said hydraulic pulse responsive motor being operable to be driven in response to alternating pulsed fluid movement in said fluid circuitry,
(c) and said fluid circuitry having selector valve means operable to condition said fluid circuitry for one operating condition in which said hydraulic pulse responsive motor is operable to be driven in one direction in response to alternating pulsed fluid movement in said fluid circuitry, said selector valve means being operable in another operating condition to condition said fluid circuitry for another operating condition in which said hydraulic pulse responsive motor is operable to be driven in a direction opposite said one direction in response to alternating pulsed fluid movement in said fluid circuitry.

2. In a transmission, the combination of
(a) a hydraulic pulse generator, a hydraulic pulse responsive motor, and fluid circuitry containing fluid operatively connecting said hydraulic pulse generator to said hydraulic pulse responsive motor,
(b) coupling motor means in said fluid circuitry effective to separate said fluid circuitry into separate generator fluid circuitry for said hydraulic pulse generator and separate motor fluid circuitry for said hydraulic pulse responsive motor, said coupling motor means being operable to transmit inphase fluid movement between said generator fluid circuitry and said motor fluid circuitry,
(c) said hydraulic pulse generator being operable when driven to impart alternating pulsed movement to the fluid in said generator fluid circuitry,
(d) and said motor fluid circuitry having selector valve means operable to condition said motor fluid circuitry for one operating condition in which said hydraulic pulse responsive motor is operable to be driven in one direction in response to alternating pulsed fluid movement in said motor fluid circuitry, said selector valve means being operable in another operating condition to condition said motor fluid circuitry for another operating condition in which said hydraulic pulse responsive motor is operable to be driven in a direction opposite said one direction in response to alternating pulsed fluid movement in said motor fluid circuitry.

3. In a transmission, the combination of
(a) a hydraulic pulse generator, a hydraulic pulse responsive motor, and fluid circuitry containing fluid operatively connecting said hydraulic pulse generator to said hydraulic pulse responsive motor,
(b) coupling motor means in said fluid circuitry effective to separate said fluid circuitry into separate generator fluid circuitry for said hydraulic pulse generator and separate motor fluid circuitry for said hydraulic pulse responsive motor, said coupling motor means being operable to transmit inphase fluid movement between said generator fluid circuitry and said motor fluid circuitry,
(c) said hydraulic pulse generator being operable when driven to impart alternating pulsed movement to the fluid in said generator fluid circuitry,
(d) said generator fluid circuitry having uncoupling valve means operable in one condition to condition said generator fluid circuitry for the transmission of the alternating pulsed fluid movement imparted by said hydraulic pulse generator whereby inphase alternating pulsed movement is transmitted by said coupling motor means to the fluid in said motor fluid circuitry, said uncoupling valve means being operable in another condition to condition said generator fluid circuitry to prevent the transmission of the alternating pulsed fluid movement imparted by said hydraulic pulse generator whereby no pulsed movement is transmitted by said coupling motor means to the fluid in said motor fluid circuitry,
(e) and said motor fluid circuitry having selector valve means operable to condition said motor fluid circuitry for one operating condition in which said hydraulic pulse responsive motor is operable to be driven in one direction in response to alternating pulsed fluid movement in said motor fluid circuitry, said selector valve means being operable in another operating condition to condition said motor fluid circuitry for another operating condition in which said hydraulic pulse responsive motor is operable to be driven in the opposite direction in response to alternating pulsed fluid movement in said motor fluid circuitry.

4. In a transmission, the combination of
(a) a hydraulic pulse generator, a hydraulic pulse responsive motor, and fluid circuitry containing fluid operatively connecting said hydraulic pulse generator to said hydraulic pulse responsive motor,
(b) coupling motor means in said fluid circuitry effective to separate said fluid circuitry into separate generator fluid circuitry for said hydraulic pulse generator and separate motor fluid circuitry for said hydraulic pulse responsive motor, said coupling motor means being operable to transmit inphase fluid movement between said generator fluid circuitry and said motor fluid circuitry,
(c) said hydraulic pulse generator being operable when driven to impart alternating pulsed movement to the fluid in said generator fluid circuitry,
(d) said generator fluid circuitry having uncoupling valve means operable in one condition to condition said generator fluid circuitry for the transmission of the alternating pulsed fluid movement imparted by said hydraulic pulse generator whereby inphase alternating pulsed movement is transmitted by said coupling motor means to the fluid in said motor fluid circuitry, said uncoupling valve means being operable in another condition to condition said generator fluid circuitry to prevent the transmission of the alternating pulsed fluid movement imparted by said hydraulic pulse generator whereby no pulsed movement is transmitted by said coupling motor means to the fluid in said motor fluid circuitry,
(e) said motor fluid circuitry having selector valve means operable to condition said motor fluid circuitry for one operating condition in which said hydraulic pulse responsive motor is operable to be driven in one direction in response to alternating pulsed fluid movement in said motor fluid circuitry, said selector valve means being operable in another operating condition to condition said motor fluid circuitry for another operating condition in which said hydraulic pulse responsive motor is operable to be driven in a direction opposite said one direction in response to alternating pulsed fluid movement in said motor fluid circuitry,
(f) and said motor fluid circuitry being operable to hydraulically lock up said hydraulic pulse responsive motor to prevent drive in said opposite direction when said motor fluid circuitry is in said one operating condition and to prevent drive in said one direction when said motor fluid circuitry is in said another operating condition.

5. In a transmission, the combination of
(a) a hydraulic pulse generator, a hydraulic pulse responsive motor, and fluid circuitry containing fluid operatively connecting said hydraulic pulse generator to said hydraulic pulse responsive motor,
(b) coupling motor means in said fluid circuitry effective to separate said fluid circuitry into separate generator fluid circuitry for said hydraulic pulse generator and separate motor fluid circuitry for said hydraulic pulse responsive motor, said coupling motor means being operable to transmit inphase fluid movement between said generator fluid circuitry and said motor fluid circuitry,
(c) said hydraulic pulse generator being operable when driven to impart alternating pulsed movement to the fluid in said generator fluid circuitry,
(d) said generator fluid circuitry having uncoupling valve means operable in one condition to condition said generator fluid circuitry for the transmission of the alternating pulsed fluid movement imparted by said hydraulic pulse generator whereby inphase alternating pulsed movement is transmitted by said coupling motor means to the fluid in said motor fluid circuitry, said uncoupling valve means being operable in another condition to condition said generator fluid circuitry to prevent the transmission of the alternating pulsed fluid movement imparted by said hydraulic pulse generator whereby no pulsed movement is transmitted by said coupling motor means to the fluid in said motor fluid circuitry,
(e) said motor fluid circuitry having selector valve means operable to condition said motor fluid circuitry for one operating condition in which said hydraulic pulse responsive motor is operable to be driven in one direction in response to alternating pulsed fluid movement in said motor fluid circuitry, said selector valve means being operable in another operating condition to condition said motor fluid circuitry for another operating condition in which said hydraulic pulse responsive motor is operable to be driven in a direction opposite said one direction in response to alternating pulsed fluid movement in said motor fluid circuitry,
(f) said motor fluid circuitry including valve means operable to close to provide a closed circuit condition to hydraulically lock up said hydraulic pulse responsive motor to prevent drive in said opposite direction when said motor fluid circuitry is in said one operating condition and to prevent drive in said one direction when said motor fluid circuitry is in said another operating condition,
(g) and said motor fluid circuitry including valve means operable to open to provide an open circuit condition to permit said hydraulic pulse responsive motor to overrun said hydraulic pulse generator when said motor fluid circuitry is in said one operating condition and when said motor fluid circuitry is in said another operating condition.

6. The transmission set forth in claim 5 and the fluid contained in said generator fluid circuitry being different than the fluid contained in said motor fluid circuitry.

7. A hydrostatic pulse transmission comprising the combination of
(a) a pump having a plurality of pump chambers including first and second pump chambers which are alternately compressed during pump operation,
(b) a motor having pulse responsive means, a first motor chamber, a second motor chamber, said pulse responsive driven means being exposed to said first motor chamber and said second motor chamber so that when fluid under pressure is supplied to said first motor chamber said pulse responsive driven means is driven in one direction and said second motor chamber acts as an exhaust and when fluid under pressure is supplied to said second motor chamber said pulse responsive driven means is driven in a direction opposite said one direction and said first motor chamber acts as an exhaust, a first delivery chamber connected to one of said pump chambers, a second delivery chamber connected to the other of said pump chambers, a supply chamber, a return chamber, a one-way valve operable to connect said first delivery chamber to said supply chamber, a one-way valve operable to connect said second delivery chamber to said supply chamber, a one-way valve operable to connect said return chamber to said first delivery chamber and a one-way valve operable to connect said return chamber to said second delivery chamber,
(c) and a selector valve operable in a first condition to connect said supply chamber to said first motor chamber and to connect said second motor chamber to said return chamber, said selector valve being operable in a second condition to connect said supply chamber to said second motor chamber and to connect said first motor chamber to said return chamber.

8. A hydrostatic pulse transmission comprising the combination of
(a) a pump having a pair of pump chambers which are alternately compressed during pump operation,
(b) first and second coupling motors each having a pair of motor chambers separated by a flexible diaphragm,
(c) one of said pump chambers being connected to one motor chamber of said first coupling motor, the other of said pump chambers being connected to one motor chamber of said second coupling motor,
(d) a motor having pulse responsive driven means, a first motor chamber, a second motor chamber, said pulse responsive driven means being exposed to said first motor chamber and said second motor chamber so that when fluid under pressure is supplied to said first motor chamber said pulse responsive driven means is driven in one direction and said second motor chamber acts as an exhaust and when fluid under pressure is supplied to said second motor chamber said pulse responsive driven means is driven in a direction opposite said one direction and said first motor chamber acts as an exhaust, a first delivery chamber, a second delivery chamber, a supply chamber and a return chamber, said first delivery chamber being connected to the other motor chamber of said first coupling motor, said second delivery chamber being connected to the other motor chamber of said second coupling motor, a one-way valve operable to connect said first delivery chamber to said supply chamber, a one-way valve operable to connect said second delivery chamber to said supply chamber, a one-way valve operable to connect said return chamber to said first delivery chamber and a one-way valve operable to connect said return chamber to said second delivery chamber.
(e) and a selector valve operable in a first condition to connect said supply chamber to said first motor chamber and to connect said second motor chamber to said return chamber, said selector valve being operable in a second condition to connect said supply chamber to said second motor chamber and to connect said first motor chamber to said return chamber.

9. A hydrostatic pulse transmission comprising the combination of
(a) a pump having a pair of pump chambers which are alternately compressed during pump operation,
(b) first and second coupling motors each having a pair of motor chambers separated by a flexible diaphragm,
(c) one of said pump chambers being connected to one motor chamber of said first coupling motor, the other of said pump chambers being connected to one motor chamber of said second coupling motor,
(d) an uncoupling valve operable to connect and disconnect said pump chambers,
(e) a motor having pulse responsive driven means, a first motor chamber, a second motor chamber, said pulse responsive driven means being exposed to said first motor chamber and said second motor chamber so that when fluid under pressure is supplied to said first motor chamber said pulse responsive driven means is driven in one direction and said second motor chamber acts as an exhaust and when fluid under pressure is supplied to said second motor chamber said pulse responsive driven means is driven in a direction opposite said one direction and said first motor chamber acts as an exhaust, a first delivery chamber, a second delivery chamber, a supply chamber and a return chamber, said first delivery chamber being connected to the other motor chamber of said first coupling motor, said second delivery chamber being connected to the other motor chamber of said second coupling motor, a one-way valve operable to connect said first delivery chamber to said supply chamber, a one-way valve operable to connect said second delivery chamber to said supply chamber, a one-way valve operable to connect said return chamber to said first delivery chamber and a one-way valve operable to connect said return chamber to said second delivery chamber, said first motor chamber being connected to said first and second transfer chambers,
(f) and a selector valve operable in a first condition to connect said supply chamber to said first chamber and to connect said second motor chamber to said return chamber, said selector valve being operable in a second condition to connect said supply chamber to said second motor chamber and to connect said first motor chamber to said return chamber.

10. A hydrostatic pulse transmission comprising the combination of
(a) pump having a bore, a double-ended piston slidably received in said bore, said pump when driven reciprocating said double-ended piston, pump chambers at the opposite ends of said bore,
(b) first and second coupling motors each having a pair of motor chambers separated by a flexible diaphragm,
(c) one of said pump chambers being connected to one motor chamber of said first coupling motor, the other of said pump chambers being connected to one motor chamber of said second coupling motor,
(d) an uncoupling valve operable to connect and disconnect said pump chambers,
(e) a motor having a pair of spaced transfer chambers, a motor gear rotatably supported in each of said transfer chamber, said motor gears being in mesh, a first delivery chamber, a second delivery chamber, a supply chamber, a first motor chamber, a second motor chamber and a return chamber, said first delivery chamber being connected to the other motor chamber of said first coupling motor, said second delivery chamber being connected to the other motor chamber of said second coupling motor, a check valve operable to connect said first delivery chamber to said supply chamber, a check valve operable to connect said second delivery chamber to said supply chamber, a check valve operable to connect said return chamber to said first delivery chamber and a check valve operable to connect said return chamber to said second delivery chamber, said first motor chamber being connected to said first and second transfer chambers at one side of said motor gears, said second motor chamber being connected to said first and second transfer chambers at another side of said motor gears,
(f) and a selector valve operable in a first condition to connect said supply chamber to said first motor chamber and to connect said second motor chamber to said return chamber, said selector valve being operable in a second condition to connect said supply chamber to said second motor chamber and to connect said first motor chamber to said return chamber.

11. In a transmission, the combination of
(a) hydraulic pulse generator unit having a drive member and a fluid port, a hydraulic pulse responsive motor unit having a fluid port, check valve means for converting fluid pulse movement into unidirectional fluid flow movement and a rotary driven member, and fluid circuit means continuously containing substantially the same fluid continuously directly connecting said hydraulic pulse generator fluid port to said hydraulic pulse responsive motor fluid port when said generator unit drives said motor unit, (b) said hydraulic pulse generator unit having pumping means for providing alternating short pulses of small outlet movement and return movement in said generator fluid port when said drive member is driven, said generator fluid port being continuously openingly connected to said fluid circuit means to impart the same alternating pulsed movement to the fluid in said fluid circuit means, said hydraulic pulse generator unit pumping means having a small fluid capacity as compared to the capacity of the fluid circuit means so that the pulsed fluid movement occurs without fluid circulation between said generator and motor units, (c) and said hydraulic pulse responsive motor unit having said motor fluid port and check valve means continuously openingly connected to said fluid circuit means when said generator unit drives said motor unit such that said driven member is continuously driven in only one direction in response to said alternating pulsed movement of the fluid in said fluid circuit means to rotate said driven member.

12. The transmission set forth in claim 11 and said fluid circuit means having flexible diaphragm means operable to separate said fluid circuit means into isolated generator and motor unit fluid circuits to directly transmit inphase fluid movement between said generator and motor fluid circuits while preventing mixing of the fluid in said separate fluid circuits.

13. The transmission set forth in claim 12 wherein the fluid contained in said generator fluid circuit is different than the fluid contained in said motor fluid circuit.

14. In a transmission, the combination of (a) hydraulic pulse generator means having a pair of chambers with each chamber having only one fluid port, hydraulic pulse responsive motor means having a pair of fluid ports and check valve means, a pair of fluid passage means containing fluid separately and directly connecting said generator means fluid ports and said motor means fluid ports, (b) said hydraulic pulse generator means having means for alternately compressing and expanding said chambers to provide pulsed reciprocating fluid movement in said generator means fluid ports to impart pulsed reciprocating movement to the fluid in said fluid passage means, said reciprocating fluid movements being transmitted to said motor means fluid ports without fluid transfer from said generator means fluid ports to said motor means fluid ports, (c) and said hydraulic pulse responsive motor means having driven means operable to be continuously driven in only one direction by a unidirectional fluid flow as caused by said check valve means in response to said reciprocating fluid movements, said check valve means directing said reciprocating fluid movements between said motor means fluid ports so that said reciprocating fluid movements are transmitted through said motor fluid ports from one generator means chamber and fluid port to the other generator means fluid port and chamber without fluid transfer from said motor means fluid ports to said generator means fluid ports.

15. In a transmission, the combination of (a) an hydraulic pulse generator unit having a drive member and a single pair of fluid ports, an hydraulic pulse responsive motor unit having a rotary driven member and a pair of fluid ports connected by two parallel fluid paths, and fluid circuit means connecting said generator unit with said pulse responsive motor unit, (b) said hydraulic pulse generator providing pulses of reciprocating fluid movement which are transmitted from one of its fluid ports through said hydraulic pulse responsive motor unit to the other of its fluid ports without fluid transfer between said generator fluid ports, (c) said parallel fluid paths each including a pair of one-way valves, a further fluid path connecting the midpoints of said parallel fluid paths and including said rotary driven member in fluid communication therewith, said one-way valves being arranged so as to convert reciprocating pulsed fluid movement appearing at said motor fluid ports into unidirectional fluid flow through said further fluid path for driving said rotary driven member in response to said reciprocating pulsed fluid movement.

16. The transmission as set forth in claim 15 wherein said pulse generator unit includes a pair of expansible chambers for imparting pulsed reciprocating movement to said fluid contained in said fluid circuit means.

17. The transmission set forth in claim 16 wherein said circuit means includes a resilient diaphragm means operable to separate said fluid circuit means into isolated generator and motor unit fluid circuits and to directly transmit inphase fluid movement between said generator and motor fluid circuits while preventing mixing of the fluid in said separate fluid circuits.

References Cited by the Examiner

UNITED STATES PATENTS

| 799,677 | 9/1905 | Schluter | 91—87 |
|---|---|---|---|
| 1,640,082 | 8/1927 | Katterjohn | 91—87 |
| 1,700,379 | 1/1929 | Skaer et al. | 91—87 |
| 3,028,727 | 4/1962 | Anston | 60—8 |
| 3,066,476 | 12/1962 | Conrad | 60—19 |

FOREIGN PATENTS

| 1,078,804 | 5/1954 | France. |
|---|---|---|

MARTIN P. SCHWADRON, *Primary Examiner.*

ROBERT R. BUNEVICH, *Examiner.*